US009086205B2

(12) United States Patent
Hagenbach et al.

(10) Patent No.: US 9,086,205 B2
(45) Date of Patent: Jul. 21, 2015

(54) INFLATABLE LIGHT DIFFUSER

(75) Inventors: Uwe Hagenbach, Munich (DE); Bernhard Grill, Seeshaupt (DE); Manfred Amling, Ering (DE)

(73) Assignee: Licht-Technik Vertriebs GmbH Hagenbach & Grill, Munich (DE)

( * ) Notice: Subject to any disclaimer, the term of this patent is extended or adjusted under 35 U.S.C. 154(b) by 981 days.

(21) Appl. No.: 13/202,658

(22) PCT Filed: Feb. 22, 2010

(86) PCT No.: PCT/EP2010/052196
§ 371 (c)(1),
(2), (4) Date: Oct. 4, 2011

(87) PCT Pub. No.: WO2010/094794
PCT Pub. Date: Aug. 26, 2010

(65) Prior Publication Data

US 2012/0134160 A1 May 31, 2012

(30) Foreign Application Priority Data

Feb. 23, 2009 (DE) ......................... 10 2009 010 209

(51) Int. Cl.
*G03B 15/02* (2006.01)
*F21V 3/02* (2006.01)
*F21V 17/20* (2006.01)
(Continued)

(52) U.S. Cl.
CPC ................. *F21V 3/026* (2013.01); *F21V 17/20* (2013.01); *F21V 17/007* (2013.01); *F21W 2131/406* (2013.01)

(58) Field of Classification Search
CPC ...................................................... G03B 15/02
USPC ............................................................ 396/4
See application file for complete search history.

(56) References Cited

U.S. PATENT DOCUMENTS 4,737,133 A 4/1988 Neumeier
6,612,711 B1 * 9/2003 Hagenbach et al. ............ 362/96
6,683,719 B2 1/2004 Hagenbach et al.
(Continued)

FOREIGN PATENT DOCUMENTS

DE 202006011892 U1 12/2006
EP 0295089 A2 12/1988
(Continued)

OTHER PUBLICATIONS

Japanese Office Action for JP 2011-550586, English translation attached to original, Dated Jan. 14, 2014, All together 5 Pages.
(Continued)

*Primary Examiner* — Clayton E Laballe
*Assistant Examiner* — Dennis Hancock
(74) *Attorney, Agent, or Firm* — Brooks Kushman P.C.

(57) ABSTRACT

A light diffuser having a holder device and an inflatable, at least partially light-transmissive box that can be attached to the holder device. The holder device includes an adapter ring formed by a light-transmissive disc, in particular a glass disc, for fastening to a spotlight and for connecting the inflatable box in a substantially airtight manner. The end of the inflatable box can be connected to the adapter ring which is surrounded by an airtight fastening ring that can be tensioned against a radially extending sealing surface on the adapter ring by at least three quick-closures, distributed about the circumference.

20 Claims, 8 Drawing Sheets

(51) Int. Cl.
*F21V 17/00* (2006.01)
*F21W 131/406* (2006.01)

(56) References Cited

U.S. PATENT DOCUMENTS

| | | | | |
|---|---|---|---|---|
| 8,313,203 | B1 * | 11/2012 | Guiney | 362/18 |
| 2002/0191295 | A1 * | 12/2002 | Hagenbach et al. | 359/599 |
| 2007/0019403 | A1 * | 1/2007 | Boghossian | 362/157 |
| 2011/0090677 | A1 * | 4/2011 | Fett et al. | 362/154 |

FOREIGN PATENT DOCUMENTS

| | | | |
|---|---|---|---|
| EP | 1108182 | B1 | 2/2003 |
| EP | 1194717 | B1 | 2/2006 |
| JP | 2003036709 | | 2/2003 |
| JP | 2006324150 | | 11/2006 |
| JP | 2007157526 | | 6/2007 |
| JP | 2007335080 | | 12/2007 |
| WO | 2006030636 | A1 | 3/2006 |

OTHER PUBLICATIONS

International Search Report for PCT/EP2010/052196 English translation attached to original, Both completed by the European Patent Office on May 11, 2010, 6 Pages all together.

http://www.licht-technik.com/download/BOL/bagolight_Turn_deu.pdf, "Bag o Light with power supply device PS50-03", English translation attached to original, Rev. 2.0, Operating Manual Version as of Mar. 18, 2009, All together 40 Pages.

* cited by examiner

INFLATABLE LIGHT DIFFUSER

CROSS-REFERENCE TO RELATED APPLICATION

This application is the U.S. national phase of PCT Appln. No. PCT/EP2010/052196 filed Feb. 22, 2010, which claims priority to German application 10 2009 010 209.4 filed Feb. 23, 2009, the disclosures of which are incorporated in their entirety by reference herein.

The present invention relates to a light diffuser, consisting of a holding device and an inflatable box, which is connectable to the holding device and is at least partly transparent to light, wherein the holding device comprises an adapter ring, comprising a disk, more particularly a glass disk, that is transparent to light, for firstly attaching it to a spotlight and secondly for attaching it in a substantially airtight fashion to the inflatable box.

Such a light diffuser is known from EP 1 194 717 B1, which can be traced back to the applicant. The inflatable box must be attached in a substantially airtight fashion on the adapter ring. The disk, more particularly a heat-resistant glass disk, which is transparent to light and provided on the adapter ring defines the light entry opening of the inflatable box. In the inflated state, the box preferably assumes a substantially cylindrical, spherical, or hemispherical shape, but also the shape of a cone or frustum. Such an illumination apparatus provides the option of a particularly homogeneous, diffuse light distribution, by means of which effects that are similar to daylight can be achieved. More particularly, such an illumination apparatus affords the possibility of avoiding mirroring effects of the light sources, which mirroring effects are disadvantageous, particularly in the case of advertisement recordings on highly reflective, shiny objects such as automobiles. In order to obtain special light effects, it may be advantageous for e.g. one half of the inflatable box to be opaque and possibly even having mirrors on the inner side. Then light directed on objects is obtained. By way of example, canvas may be used as material for the light box. However, care has to be taken that the material is not only sufficiently transparent to light, but also in particular resistant to heat.

In order to inflate the light box, a pressurized-gas connector and an electronically actuatable valve for the gas supply are arranged at the adapter ring of the known device, wherein a first pressure sensor determines the increasing internal pressure in the box fixed to the ring and supplies a switch-off signal when an adjustable or predeterminable maximum pressure value has been reached such that the filling of the box is completed automatically, to be precise independently of whether and to what extent a pushbutton for actuating the valve is still activated or not. The aforementioned pushbutton may be activated manually for the filling or refilling of gas, wherein an automatic final switch-off is ensured.

Using the aforementioned prior art and EP 1 108 182 B1 as a starting point, the present invention is based on the object of developing a light diffuser of the type mentioned at the outset, in which the light box can be connected in an airtight and very simple fashion to the adapter ring of the holding device. Moreover, it is an object to simplify the apparatus for inflating and pressure regulation.

According to the invention, the first-mentioned object is achieved by the characterizing features of claim 1, wherein advantageous design developments and details are described in the dependent claims. As a result of the design according to the invention, it is no longer necessary to attach the light box to the adapter ring of the holding device with a type of hose clamp. The design according to the invention is significantly more advantageous in terms of handling, but also in terms of airtightness. There is also significantly reduced design complexity, wherein the embodiment as per claim is downright minimalistic. The adapter ring only comprises a few components, specifically an annular disk, a holding ring, a glass disk, and a flat gasket ring. These parts are held together by screws arranged equidistantly around the circumference. The flat gasket ring has a dual function. On the one hand, it serves for sealing the glass disk and on the other hand it serves as an annular support area for the light box or an attachment ring associated with the light box.

The compressed-air-technical apparatuses as per claims 7, 8 and/or 9-11 and/or 12, 13 are also of particular importance.

The attachment ring provided according to the invention, by means of which the end of the light box that is connectable to the adapter ring in an airtight fashion, preferably consists of two sheet-metal rings, which are each produced from a sheet-metal strip or sheet-metal band. The associated end section of the light box is clamped, in an airtight fashion, between these two sheet-metal rings. The sheet-metal rings consist of aluminum or stainless steel.

In order to ensure the aforementioned airtight clamping of the end section of the light box, a sealing layer, more particularly a silicone layer, is respectively arranged between outer ring and box and/or between inner ring and box such that not only the boundary area between outer ring and box and/or inner ring and box, but also passages or bores for holding rivets, screws, valves, or air connectors are each sealed toward the circumferential side. The aforementioned sealing layer thus ensures airtight fixing of the end section of the light box whilst at the same time ensuring dimensional stability of this end section for the purpose of an airtight connection to the adapter ring of the holding device. The sealing area extending radially on the adapter ring, i.e. approximately perpendicularly to the central longitudinal axis of the adapter ring, is preferably formed by a flat ring gasket made of silicone, rubber or similar elastic sealing material.

The quick-release fasteners provided according to the invention are preferably formed by clip fasteners, the clips of which are hinged either on the attachment ring or on the adapter ring, wherein, in order to lock the light box or the attachment ring associated therewith on the adapter ring, the free clip ends, which have a hook-like form, engage behind a circumferential edge formed either on the adapter ring or on the attachment ring.

A particularly advantageous embodiment is moreover characterized in that the holding device comprises a mount ring for holding the adapter ring in a rotational fashion around the central longitudinal axis thereof. This embodiment always offers itself when the light box comprises sections that are opaque to light. Then the alignment of the light is variable, like in the case of a pivotably mounted spotlight.

Further advantages and details of the suggestions according to the invention are explained in more detail on the basis of the exemplary embodiments illustrated in the attached drawings. In these drawings.

Figure 6:
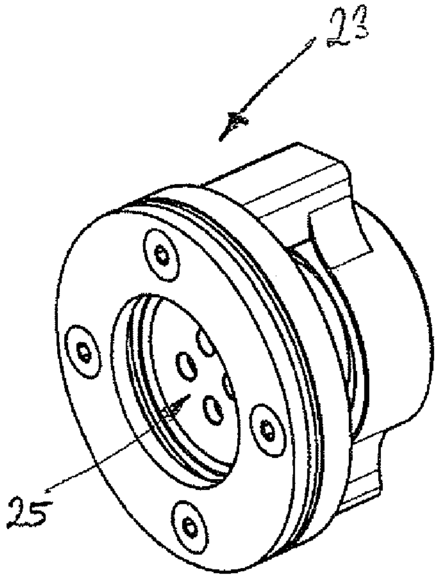
Figure 7:
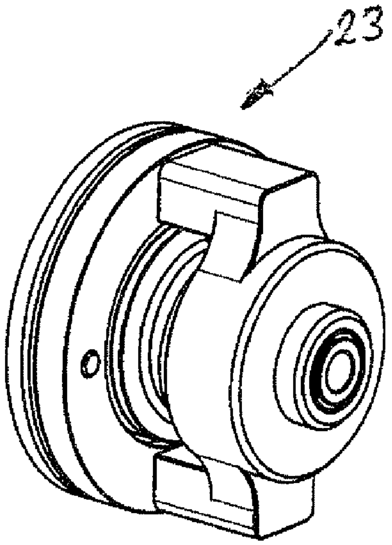
Figure 8:
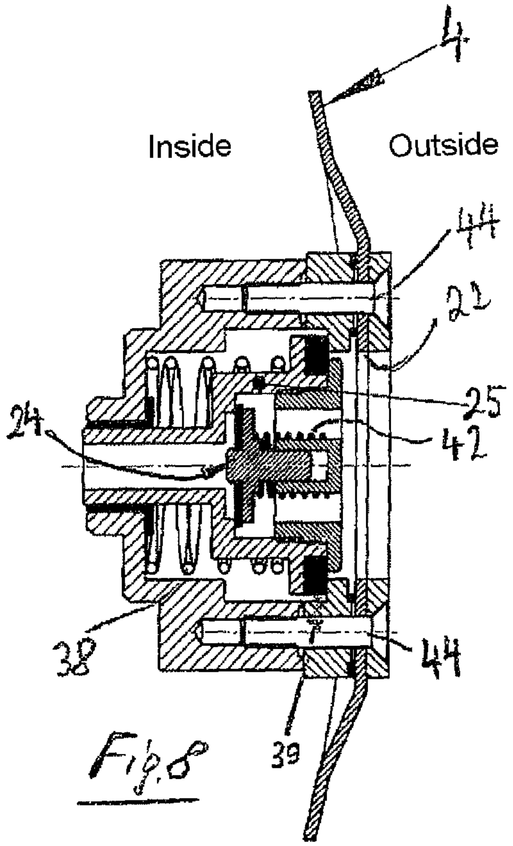
Figure 10:
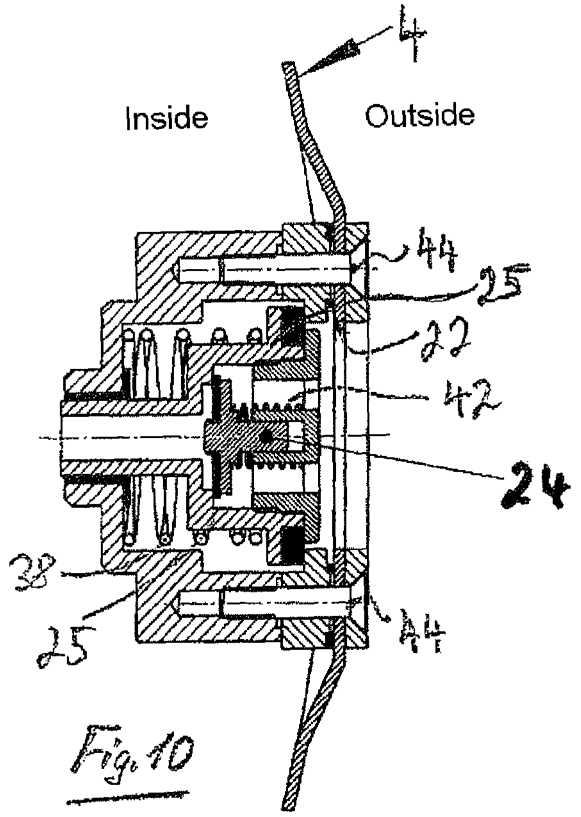

FIGS. 6+7 show a perspective view of a preferably utilized double valve firstly from the front or outside and secondly from the inside or the rear;

FIGS. 8+9 respectively show a longitudinal section of the double valve as per FIGS. 6+7; to be precise, firstly in a closed position and secondly in an open position for ventilating or inflating the associated light box; and FIGS. 10+11 show a longitudinal section of the double valve corresponding to FIGS. 8+9 with a description of an integrated relief valve in closed and open position.

Figure 1:
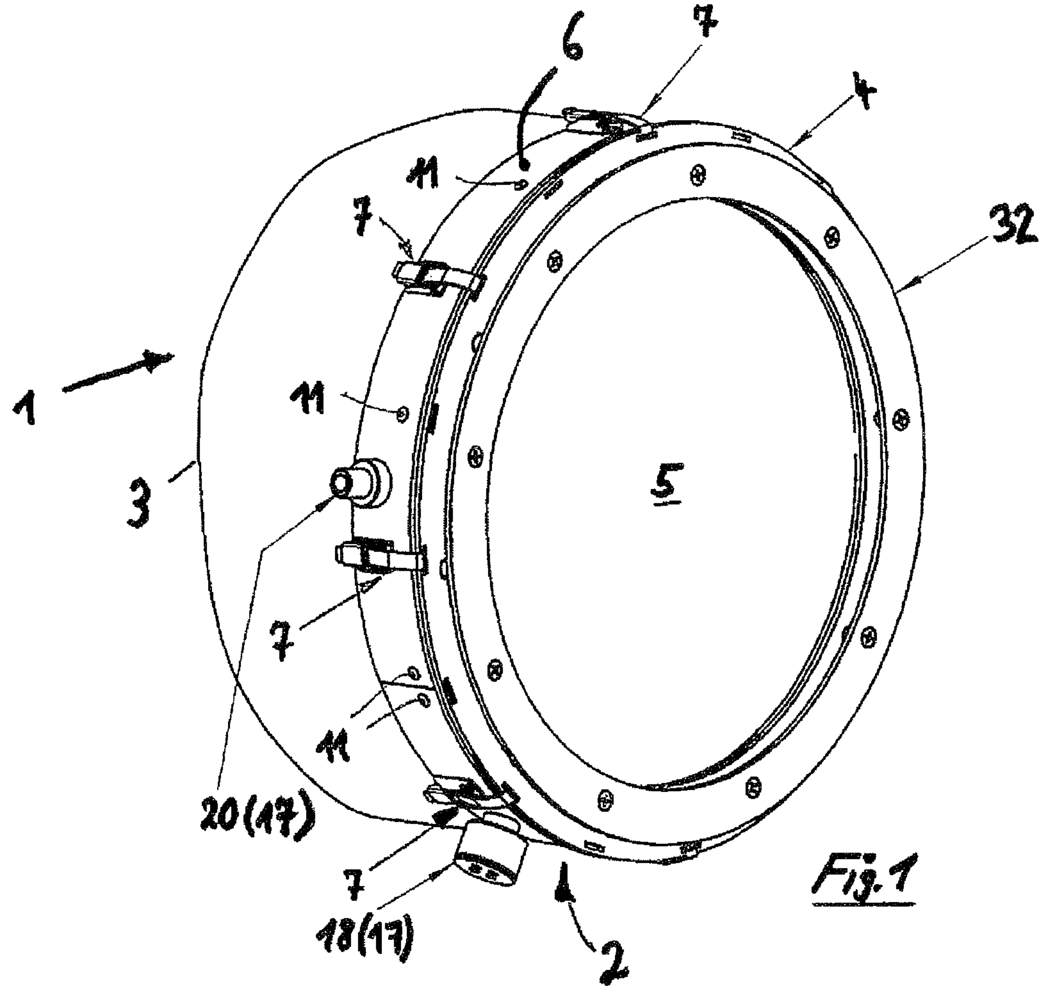
FIG. 1 shows a perspective view of a first embodiment of a holding device according to the invention for a light diffuser.
Figure 2:
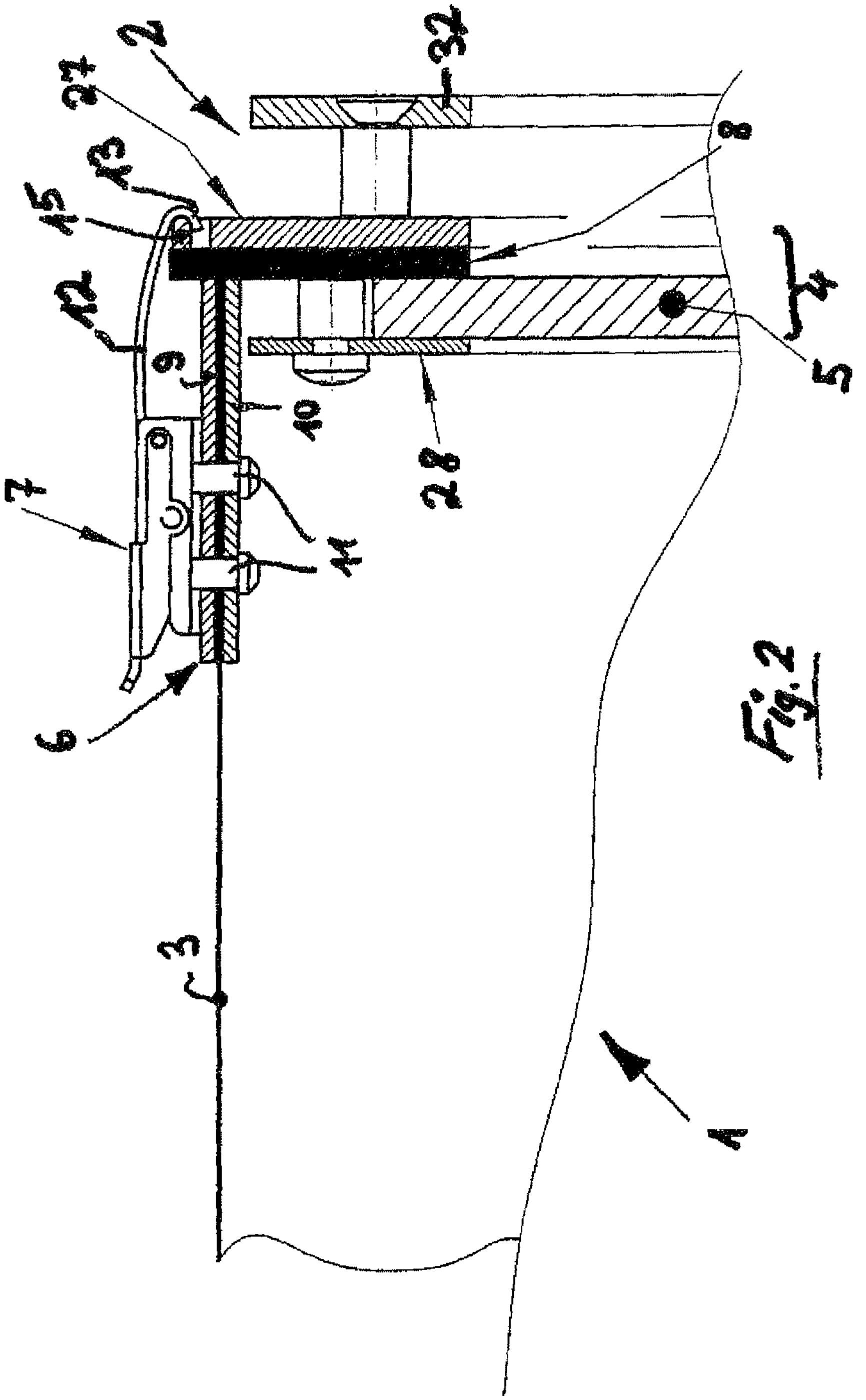
FIG. 2 shows a schematic longitudinal section of part of the device as per FIG. 1.

FIGS. 1 and 2 show a first embodiment of a light diffuser 1, consisting of a holding device 2 and an inflatable box 3, which is connectable to the holding device 2 and is at least partly transparent to light, wherein the holding device 2 comprises an adapter ring 4, comprising glass disk 5, that is transparent to light and resistant to heat for firstly attaching it to a spotlight and secondly for attaching it in an airtight fashion to the inflatable light box 3. An annular holding flange 32 is arranged on the side opposite or facing away from the light box connector side of the adapter ring 4; to be precise, it is arranged at a distance from the adapter ring 4. This holding flange 32 serves for connection to the spotlight (not illustrated in any more detail).

It is of particular importance that the end of the light box 3 that is connectable to the adapter ring 4 is enclosed in an airtight fashion by an attachment ring 6, which can be clamped against a radially extending sealing area 8 on the adapter ring by means of at least three, in this case eight, quick-release fasteners in the form of clip fasteners 7 that are arranged approximately equidistantly around the circumference of said attachment ring. The attachment ring 6 comprises an inner sheet-metal ring 10 and an outer sheet-metal ring 9. The associated end section of the light box 3 has been clamped between these two sheet-metal rings in an airtight fashion (see FIG. 2 in this respect). In order to ensure the airtight clamping of the end section of the light box between the two sheet-metal rings 9 and 10, a sealing layer, more particularly a thin silicone layer, is respectively arranged firstly between outer ring 9 and box 3 and secondly between inner ring 10 and box 3. As a result, not only the boundary areas between outer ring 9 and light box 3, and inner ring 10 and light box 3, but also all passages or bores for holding rivets 11, screws, valves, or air connectors are each sealed toward the circumferential side. FIGS. 1 and 2 also make it possible to identify that the inner and outer sheet-metal rings are each formed by an annularly bent metal band.

As per FIG. 2, the sealing area 8 extending radially on the adapter ring 4 is formed by a flat ring gasket made of silicone, rubber, or similar elastic sealing material. The quick-release fasteners 7 are each defined by clip fasteners, the clips 12 of which are hinged on the attachment ring 6 in the embodiment as per FIGS. 1 and 2, wherein the associated hinge device is riveted onto the outer attachment ring 9 (rivets 11 in FIG. 2). The free clip ends 13 of the clips 12 engage behind a circumferential edge 15 formed on the adapter ring 4 for the purpose of locking the light box 3 or the attachment ring 6 associated therewith on the adapter ring 4.

In the embodiment according to FIGS. 1 and 2, the adapter ring 4 itself is formed by an annular disk 27 and a holding ring 28, between which the glass disk 5, and between glass disk 5 and annular disk 27, the flat gasket ring 8, are held together in a clamping fashion. The annular disk 27 and the flat gasket ring 8 protrude radially outward over the glass disk 5 and the glass holding ring 28 whilst forming an annular support area for the attachment ring 6 associated with the light box 3. The clip fasteners 7 accordingly press the attachment ring 6 against the elastic flat gasket ring 8 with its free end face, in accordance with FIG. 2. As a result, the light box 3 is connected in an airtight fashion to the adapter ring 4 along the circumference of the attachment ring 6. Since the glass disk 5 is likewise attached to the adapter ring 4 in an airtight fashion, the interior space in the light box 3 can be sealed in an airtight fashion with respect to the external environment.

Figure 3:
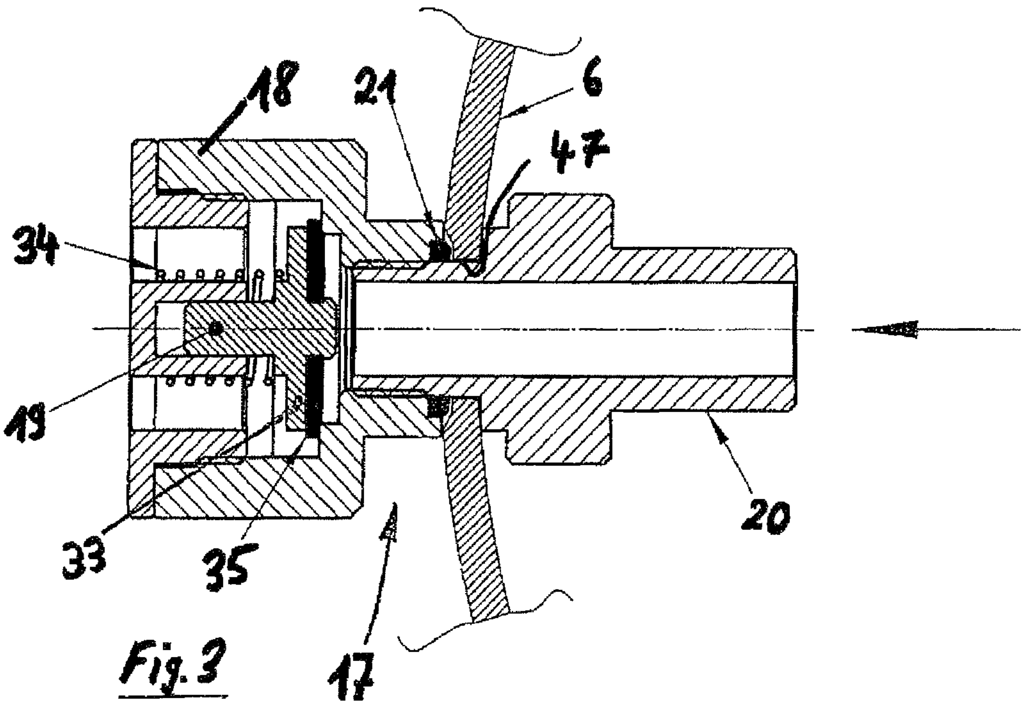
FIG. 3 shows a longitudinal section of an exemplary embodiment of a preferably utilized check valve.

In accordance with FIG. 3, a check valve 17 may be assembled within a passage opening 47 in the attachment ring 6, which check valve 17 opens at a predetermined internal pressure and acts either as a relief valve or inflation valve, depending on installation position. In the embodiment illustrated in FIG. 3, the check valve serves as a relief valve. It comprises firstly a valve housing 18 with a valve body 19 and secondly a sleeve-like adapter 20 for connection to a pressurized-air source, more particularly an air pump, wherein the attachment ring 6 is clamped in a fluid-tight fashion between valve housing 18 and sleeve-like adapter 20 during the assembly of the check valve 17. The fluid seal between attachment ring 6 on the one hand and check valve 17 on the other hand is ensured by the gasket ring, specifically O-ring 21, illustrated in FIG. 3.

The valve body 19 comprises a valve disk 33, which is pressed against a sealing area within the valve housing by a compression spring 34. To this end, another gasket ring 35 is arranged between valve disk 33 and housing sealing area. This further gasket ring also preferably consists of silicone or a similar elastic material.

If the pressure in the interior of the light box 3 becomes too great, the former acts through the adapter sleeve 20 on the valve disk 33 and lifts the latter from the housing sealing seat against the action of the compression spring 34. Air can then escape outward from the light box until an internal pressure predetermined by the compression spring 34 is reached once again. The relief valve 17 preferably opens from approximately 35 mbar.

When installed back-to-front, the adapter sleeve 20 is situated on the outside and the valve housing 18 with valve body 19 are situated on the inside. Then an air pump or a similar compressed-air source can be connected to the adapter sleeve for the purpose of inflating the light box 3. Thus, two check valves of the type presented here are preferably provided on the attachment ring; to be precise, in respectively back-to-front installation positions such that one check valve acts as an inflation valve and the other check valve acts as relief valve. In this respect, reference is made to FIG. 1, where this back-to-front installation position of the check valve 17 can be identified.

Figure 4:
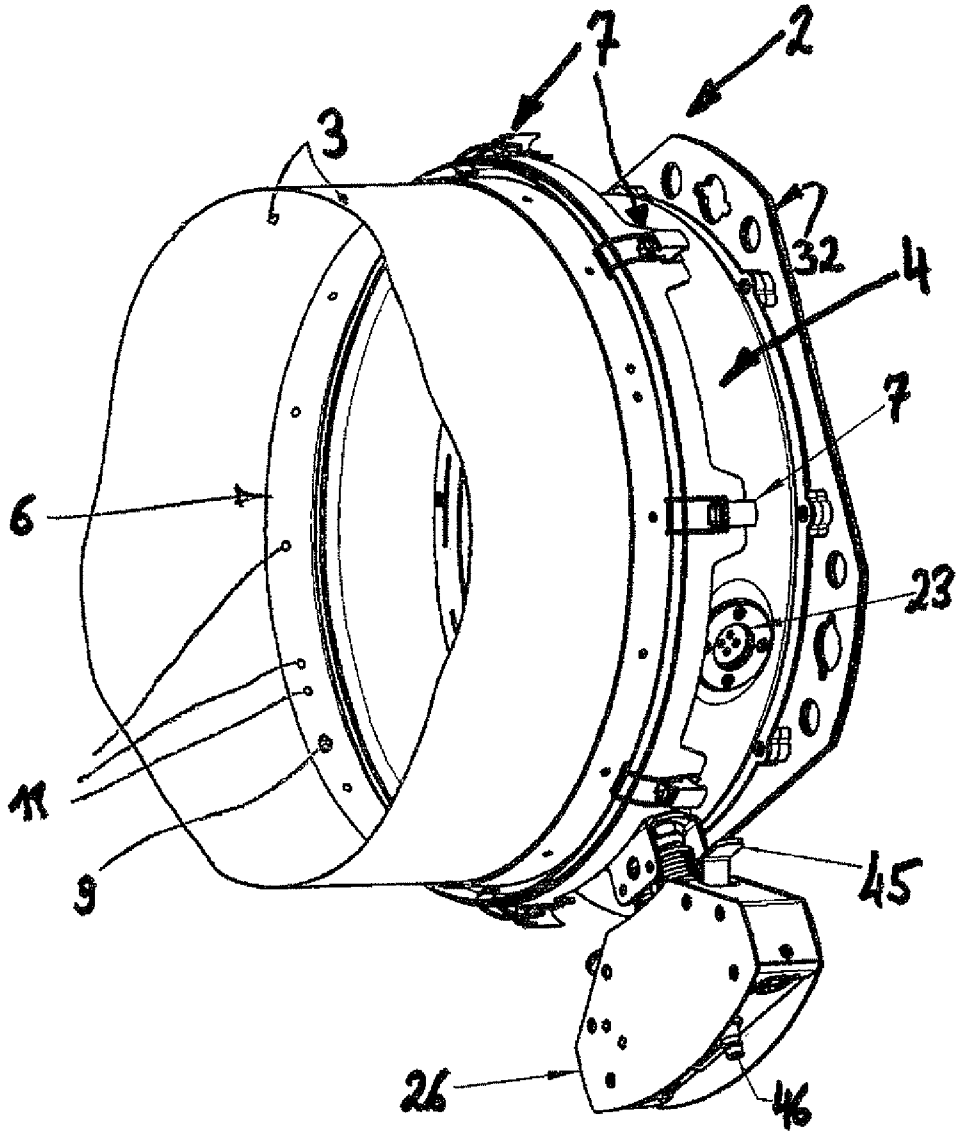
FIG. 4 shows a perspective view of a second embodiment of a holding device designed according to the invention for a light box.
Figure 5:
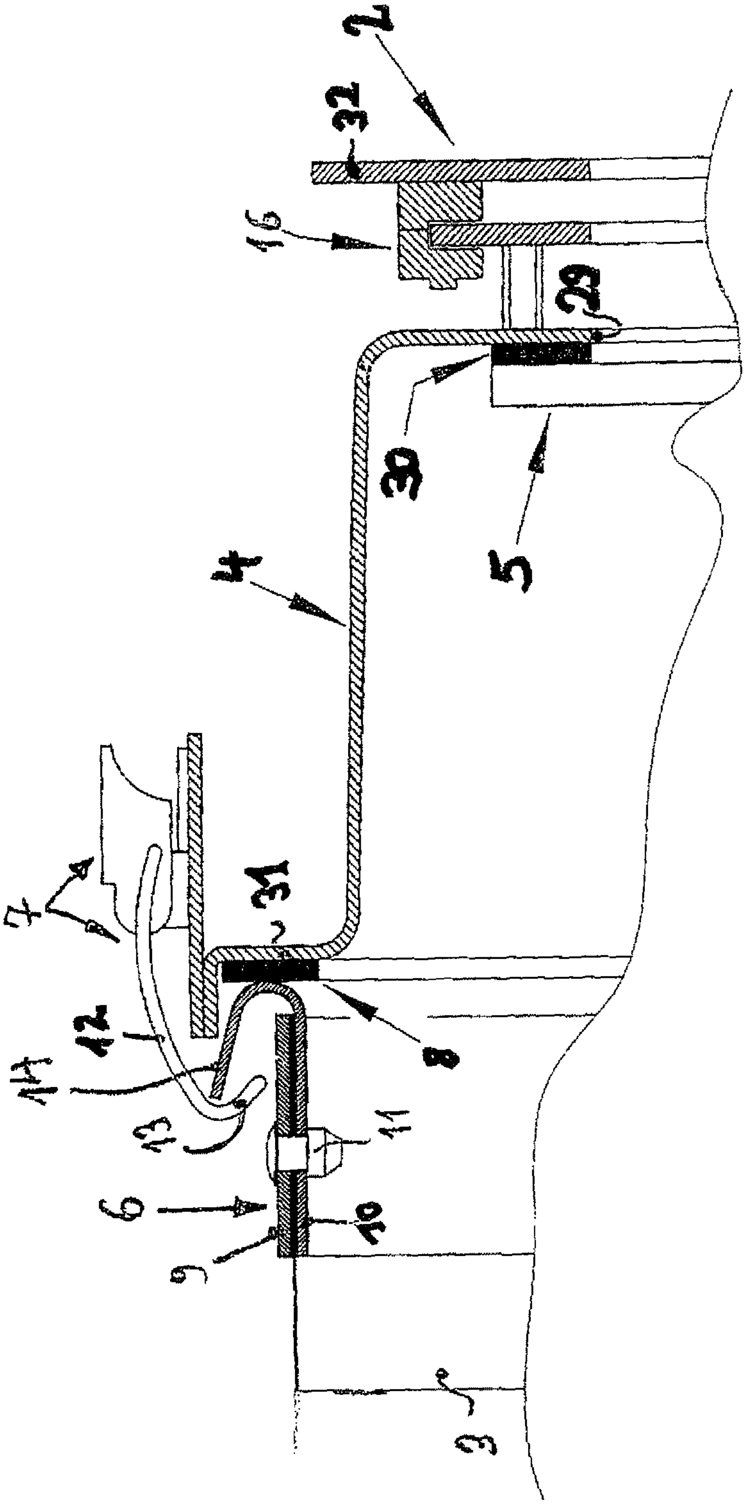
FIG. 5 shows a schematic longitudinal section of part of the device as per FIG. 4.

The embodiment as per FIGS. 4 and 5 predominately differs from that as per FIGS. 1 to 3 in the slightly different design of adapter ring 4 and associated attachment ring 6. In accordance with FIG. 5, the adapter ring 4 has a pot-like design, wherein the base comprises an annular opening 29, which is sealed in an airtight fashion by the glass disk 5 under interposition of an annular gasket 30. The free edge of the pot-like adapter ring 4, which edge faces the light box 3, is bent outward forming an annular area 31 for the flat gasket ring 8, against which the attachment ring 6 associated with the light box 3 can be clamped in an airtight fashion. For this purpose, provision is made in turn for quick-release fasteners in the form of clip fasteners 7, but the latter are in this case hinged on the adapter ring 4. The free clip ends 13 of the clips 12 accordingly engage behind a circumferential edge 14 formed on the attachment ring 6 for locking the light box 3 or the attachment ring 6 associated therewith on the adapter ring 4. This circumferential edge 14 is formed by virtue of the fact that the inner sheet-metal ring 10 is bent outward in an approximately U-shaped fashion around the free end edge of the outer sheet-metal ring 9, as illustrated in FIG. 5.

Otherwise, the free end section of the light box 3 in this embodiment is also clamped between outer and inner sheet-metal ring 9, 10 under interposition of a sealant as described above. The hold between outer and inner sheet-metal ring is brought about by rivets 11. The rivet passages are sealed by the aforementioned sealants between firstly the light box 3 and secondly the outer and inner sheet-metal ring.

The embodiment as per FIGS. 4 and 5 is moreover distinguished by virtue of the fact that the holding device 2 comprises a mount ring 16 for holding the adapter ring 4 in a rotational fashion around the central longitudinal axis thereof. In the embodiment illustrated in FIG. 5, the mount ring 16 has a two-part design and so it is very easy to assemble the adapter ring 4 on the annular holding flange 32. The mount ring 16 merely needs to be opened for this purpose. The same of course holds true for disassembling or interchanging the adapter ring 4.

It is also possible to gather from FIG. 4 that a dual-action or double valve 23 is assembled in the adapter ring 4, the former firstly opening outward at a predetermined pressure within the inflatable light box 3, i.e. acting as a relief valve, and secondly being able to be brought into an opening position from the outside, in which the light box 3 can be both inflated and emptied in an accelerated fashion.

To this end, the double valve 23 has two valve bodies 24 and 25 that are effective in opposite directions and the functionality of which can be identified from FIGS. 8 to 11. The one valve body 24 is active within the other valve body 25. The outer valve body 25 defines the valve housing for the inner valve body 24. In this respect, the inner valve body 24 and the outer valve body 25 define a check valve corresponding to the check valve as per FIG. 3. This means that the inner valve body 24 opens above a specific positive pressure in the light box 3. In accordance with FIG. 9, the outer valve body 25 can, from the outside, be brought mechanically from the closed position as per FIG. 8 into an open position as per FIG. 9. As per FIG. 9, this is brought about by a manual ventilator nozzle 36 that can be pressed against the outer valve body 25 from the outside. This manual ventilator nozzle makes it possible to empty the air bag in an accelerated fashion. Alternatively, the manual ventilator nozzle can also be connected to a pressurized-air source for quickly filling the light box 3.

Figure 11:
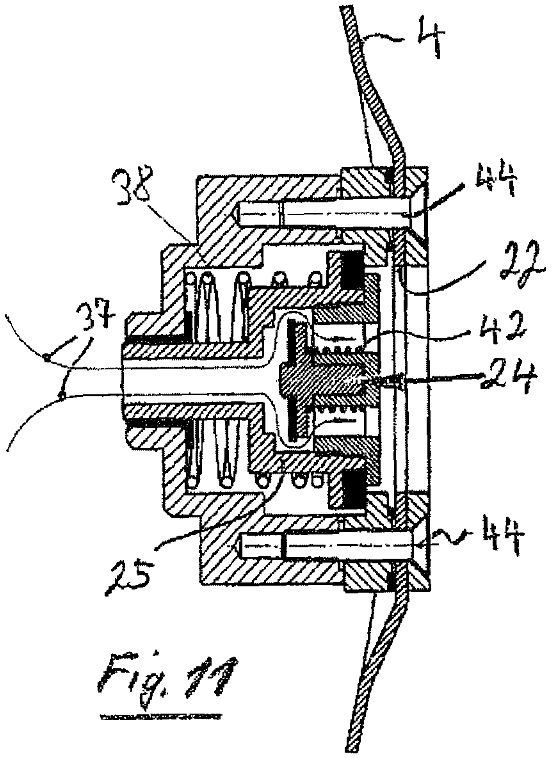

FIGS. 10 and 11 make it possible to identify the action of the inner valve body 24. Here, the valve acts as a relief valve in accordance with the relief valve as per FIG. 3. The relief valve in this case also preferably opens from approximately 35 mbar. FIG. 10 shows the relief valve in a closed state, FIG. 11 shows it in the open state. More particularly, the air escaping the light box in the case of positive pressure is indicated by the arrows 37 in FIG. 11. Here it can be seen that the valve disk of the inner valve body 24 in this case lifts off from the associated sealing seat within the outer pot-like valve body 25, as a result of which the inner relief valve is opened.

Figure 9:
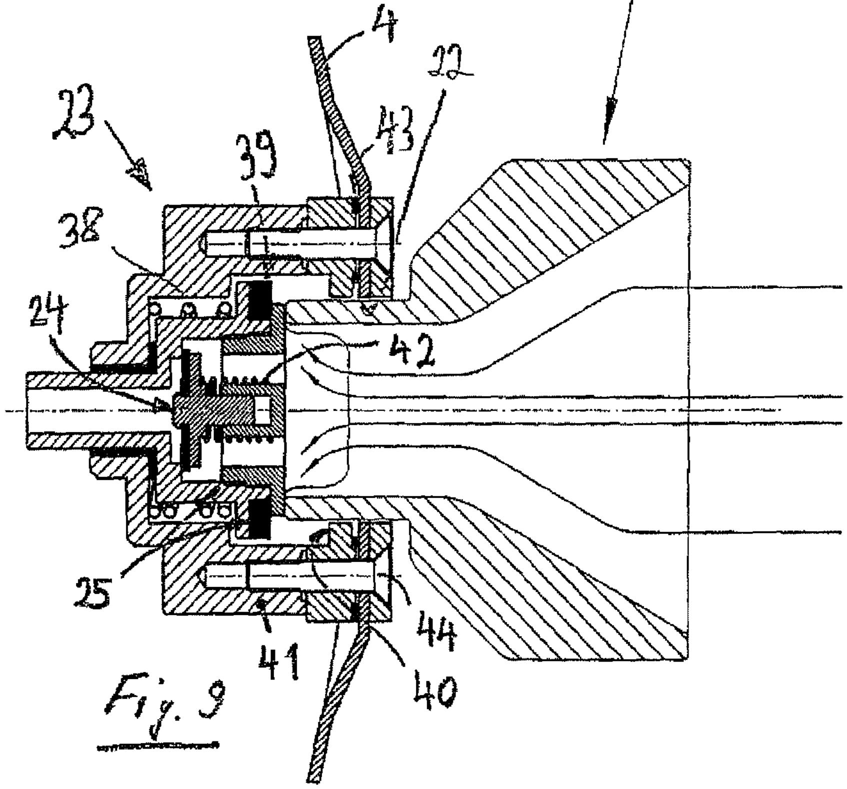

In the case of the position of the outer valve body 25 in accordance with FIG. 9, a flow connection is established between the interior of the light box 3 and the external environment whilst avoiding the inner relief valve with the valve body 24. For this purpose the outer valve body is pushed inward against the action of a compression spring 38. As a result, an annular gasket 39 is lifted off an associated housing sealing seat 40 in the interior of a valve housing 41.

The inner valve body 24 is likewise pushed into a closed position by a compression spring 42. This compression spring 42 corresponds to the compression spring 34 in FIG. 3. The valve housing 41 is attached on the inner side of the adapter ring 4 under interposition of an annular gasket 43 by means of screws 44, to be precise in association with the passage opening 22 in the side wall of the pot-shaped adapter ring 4.

Finally, it is also possible to gather from FIG. 4 that an air control instrument 26 is connectable to the adapter ring 4, by means of which air control instrument the pressure within the light box 3 can be regulated between a lower and upper limit. The air control instrument 26 is removable. It regulates the pressure preferably between 15 and 35 mbar. It comprises a delivery connection 46, which is under a pressure of between 0 and 12 bar. The air control instrument can be connected, either directly or via a heat-resistant connection tube, to the adapter ring or connection sites or interfaces provided thereon. The aforementioned interfaces comprise two automatically closing compressed-air couplings for connecting a measuring line and a pressure line.

An actuator lever 45 allows simple release of the air control instrument 26 from the aforementioned interfaces, whilst at the same time unlocking the measuring and pressure lines.

All features disclosed in the application documents are claimed as being essential to the invention to the extent that they, individually or in combination, are novel over the prior art.

REFERENCE SIGNS

1 Light diffuser
2 Holding device
3 Inflatable box (light box)
4 Adapter ring
5 Glass disk
6 Attachment ring
7 Quick-release fastener (clip fastener)
8 Sealing area (flat gasket ring)
9 (Outer) sheet-metal ring
10 (Inner) sheet-metal ring
11 Rivets
12 Clips of the clip fasteners
13 Clip end
14 Circumferential edge on the attachment ring 6
15 Circumferential edge on the adapter ring 4
16 Mount ring
17 Check valve
18 Valve housing
19 Valve body (valve disk)
20 Adapter (sleeve)
21 Gasket ring
22 Passage opening
23 Double valve
24 Valve body
25 Valve body
26 Air control instrument
27 Annular disk
28 Holding ring
29 Opening
30 Annular gasket
31 Annular area
32 Annular holding flange
33 Valve disk
34 Compression spring
35 Gasket ring
36 Manual ventilator nozzle
37 Arrow
38 Compression spring
39 Seal
40 Housing sealing seat
41 Valve housing 42 Compression spring
43 Annular gasket
44 Screw
45 Actuation lever
46 Delivery connection
47 Passage opening

The invention claimed is:

1. A light diffuser, comprising:

a holding device and an inflatable box connectable to the holding device and at least partly transparent to light, wherein the holding device comprises:

an adapter ring comprising a glass disk that is transparent to light, wherein the adapter ring is attachable to a spotlight and in a substantially airtight fashion to the inflatable box, and wherein an end section of the inflatable box that is connectable to the adapter ring is enclosed in an airtight fashion by an attachment ring associated with the inflatable box which can be clamped against a radially extending sealing area on the adapter ring by at least three quick-release fasteners that are arranged approximately equidistantly around a circumference of the attachment ring.

2. The light diffuser of claim 1, wherein the attachment ring comprises a plurality of rings between which the end section of the inflatable box is clamped in an airtight fashion.

3. The light diffuser of claim 2, wherein a sealing layer is arranged between an outer ring and the inflatable box and/or between an inner ring and the inflatable box such that not only a boundary area between the outer ring and the inflatable box and/or the inner ring and the inflatable box, but also passages or bores for holding rivets, screws, valves, or air connectors are each sealed toward a circumferential side.

4. The light diffuser of claim 3, wherein the sealing layer is a silicone layer.

5. The light diffuser of claim 2, wherein the plurality of rings comprise two sheet metal rings.

6. The light diffuser of claim 1, wherein the radially extending sealing area on the adapter ring is formed by a flat ring gasket made of silicone, rubber, or similar elastic sealing material.

7. The light diffuser of claim 1, wherein the quick-release fasteners are formed by clip fasteners, clips of which are hinged either on the attachment ring or on the adapter ring, wherein the free clip fasteners engage behind a circumferential edge formed either on the adapter ring or on the attachment ring to lock the inflatable box or the attachment ring to the adapter ring.

8. The light diffuser of claim 1, wherein the holding device comprises a mount ring for holding the adapter ring in a rotational fashion around a central longitudinal axis.

9. The light diffuser of claim 1, wherein a check valve that opens at a predetermined pressure can be assembled within a passage opening in the adapter ring or in the attachment ring, wherein the check valve acts either as a relief valve or an inflation valve, depending on an installation position.

10. The light diffuser of claim 9, wherein the check valve comprises a valve housing with a valve body and a sleeve-like adapter for connection to a pressurized-air source, wherein the attachment ring is clamped in a fluid-tight fashion between the valve housing and the sleeve-like adapter during assembly of the check valve.

11. The light diffuser of claim 1, wherein a dual-action or double valve can be assembled within a passage opening in the attachment ring or in the adapter ring, the dual-action or double valve opening outward at a predetermined pressure within the inflatable box, acting as a relief valve, and capable of being brought from the outside into an opening position, in which the inflatable box can be inflated and emptied in an accelerated fashion.

12. The light diffuser of claim 11, wherein the dual-action or double valve has two valve bodies that are effective in opposite directions, wherein one valve body is active within another valve body.

13. The light diffuser of claim 12, wherein an inner valve body opens above a specific positive pressure in the inflatable box while an outer valve body can be brought mechanically from a closed position into an opened position.

14. The light diffuser of claim 13, wherein the outer valve body can be brought from the closed position into the opened position against an action of a compression spring that pushes the outer valve body into the closed position.

15. The light diffuser of claim 1, wherein an air control instrument is connectable to the attachment ring or the adapter ring so that pressure within the inflatable box can be regulated between a lower and an upper limit.

16. The light diffuser of claim 15, wherein the air control instrument comprises a measuring line and a compressed-air line, both of which can be coupled to corresponding interfaces in the adapter ring.

17. The light diffuser of claim 1, wherein the adapter ring comprises the glass disk between an annular disk and a holding ring and a flat gasket ring between the glass disk and the annular disk wherein the glass disk and the flat gasket ring are held together in a clamping fashion, and wherein the annular disk and the flat gasket ring protrude radially outward over the glass disk and the glass holding ring whilst forming an elastic annular support area for the attachment ring of the inflatable box.

18. The light diffuser of claim 1, wherein the adapter ring has a pot-like design, wherein the base comprises an annular opening sealed in an airtight fashion by the glass disk under interposition of an annular gasket, and wherein a free edge is bent outward forming an annular area for the flat gasket ring against which the attachment ring of the inflatable box can be supported or clamped in an airtight fashion.

19. The light diffuser of claim 1, wherein a check valve that opens at a predetermined pressure can be assembled within a passage opening in the attachment ring, wherein the check valve acts either as a relief valve or an inflation valve, depending on an installation position.

20. A light diffuser, comprising:

a holding device and an inflatable box connectable to the holding device and at least partially transparent to light, wherein the holding device comprises an adapter ring comprising a glass disk that is transparent to light, wherein the adapter ring is attachable to a spotlight and in a substantially airtight fashion to the inflatable box, and wherein an end section of the inflatable box that is connectable to the adapter ring is enclosed in an airtight fashion by an attachment ring associated with the inflatable box which can be clamped against a radially extending sealing area on the adapter ring by at least three quick-release fasteners that are arranged approximately equidistantly around a circumference of the attachment ring, and wherein the attachment ring comprises a plurality of rings between which the end section of the inflatable box is clamped in an airtight fashion.

* * * * *